No. 741,901. PATENTED OCT. 20, 1903.
S. W. FINCH.
SEVERING RULE FOR CHECKS, &c.
APPLICATION FILED JAN. 3, 1903.
NO MODEL. 4 SHEETS—SHEET 1.
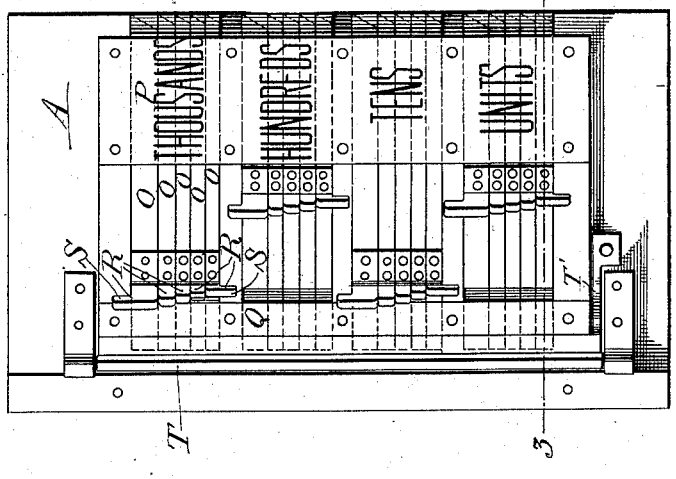
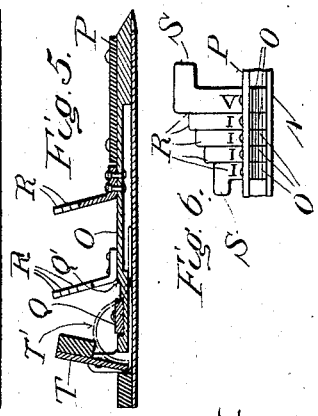
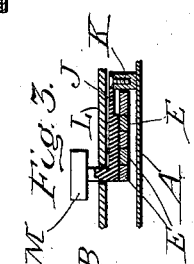
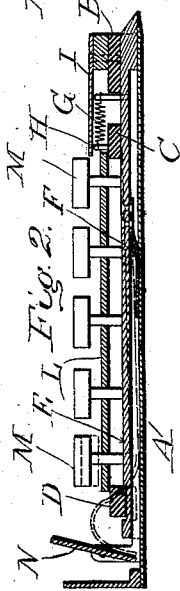
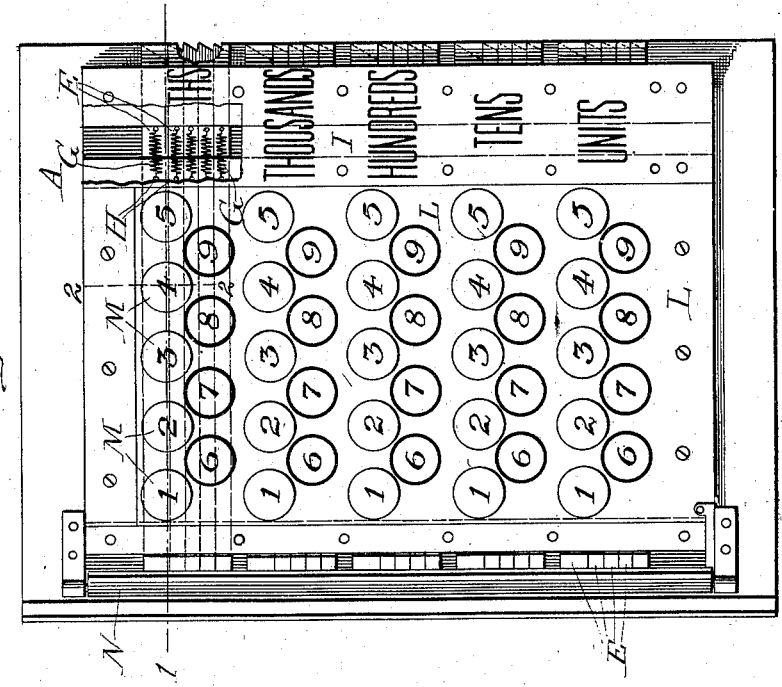
Witnesses
CC Brudene
J. B. Malnati
Inventor:
Stanley W. Finch,
by Dodge and Son,
Attorneys

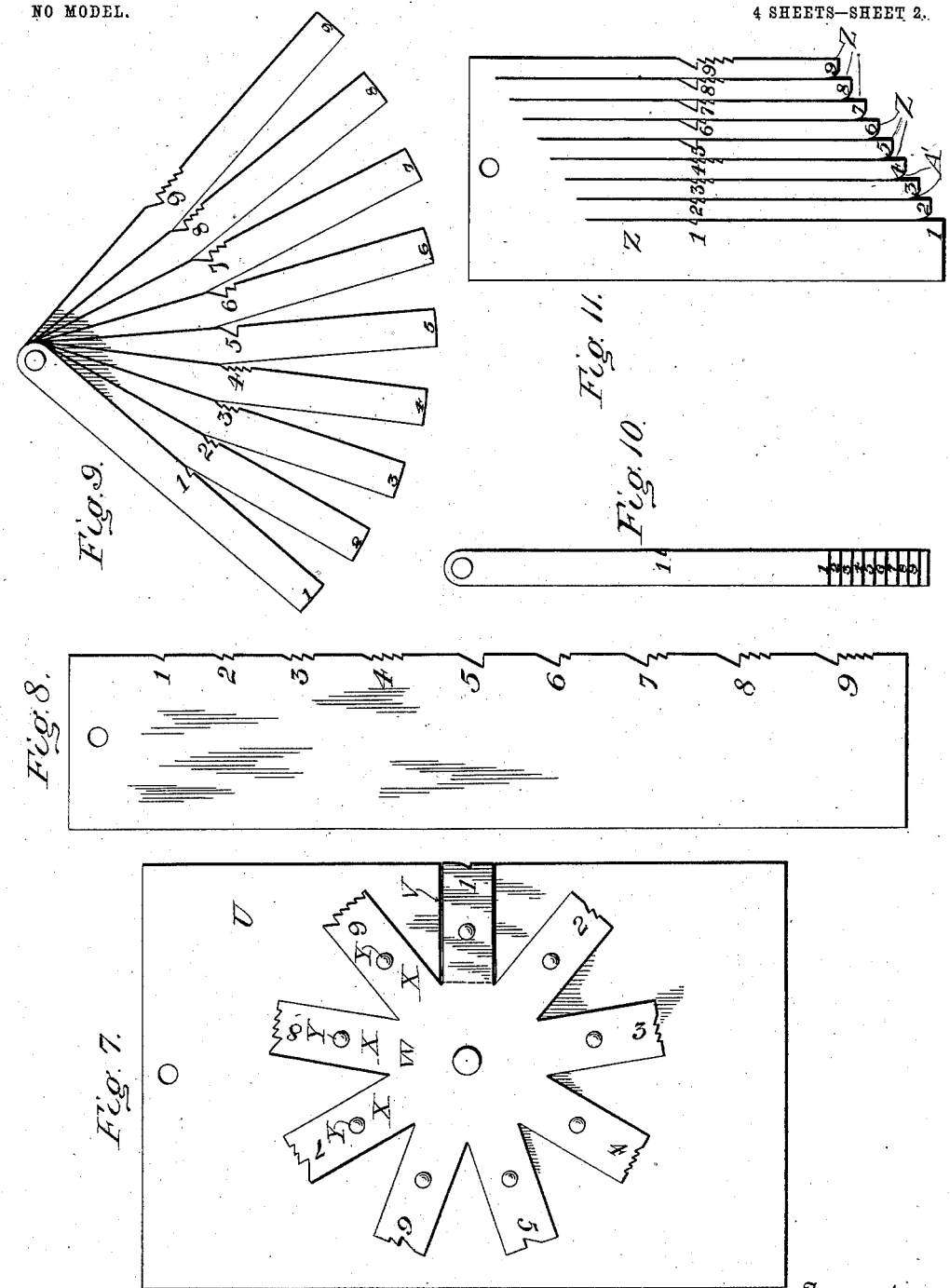

No. 741,901. PATENTED OCT. 20, 1903.
S. W. FINCH.
SEVERING RULE FOR CHECKS, &c.
APPLICATION FILED JAN. 3, 1903.
NO MODEL. 4 SHEETS—SHEET 3.
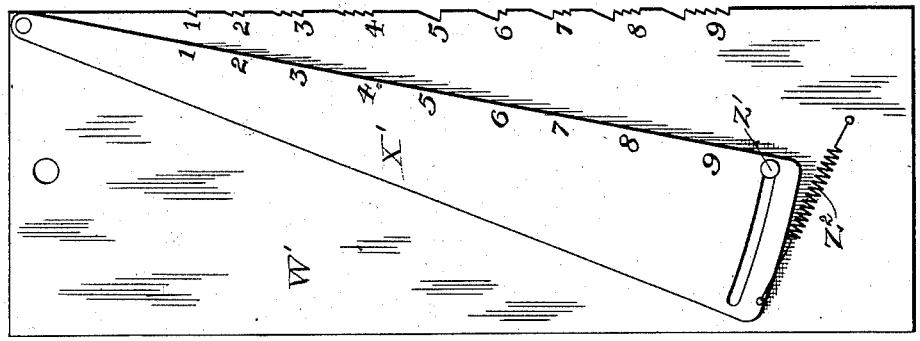
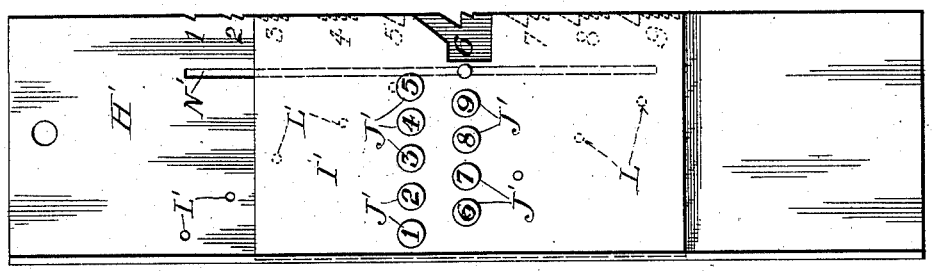
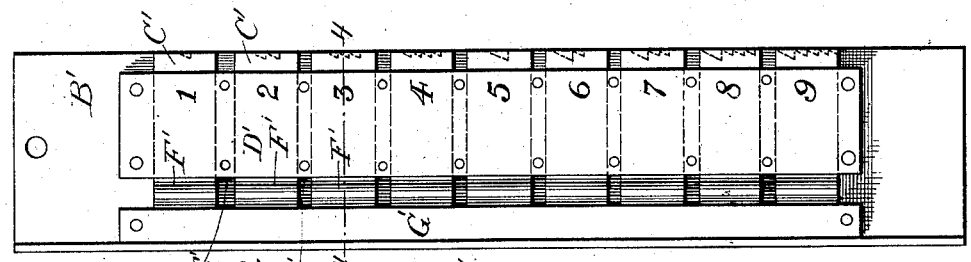
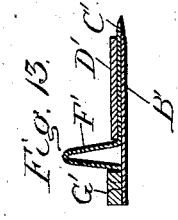
Witnesses
Inventor:
Stanley W. Finch,
by Dodge and Sons,
Attorneys No. 741,901. PATENTED OCT. 20, 1903.
S. W. FINCH.
SEVERING RULE FOR CHECKS, &c.
APPLICATION FILED JAN. 3, 1903.
NO MODEL. 4 SHEETS—SHEET 4.
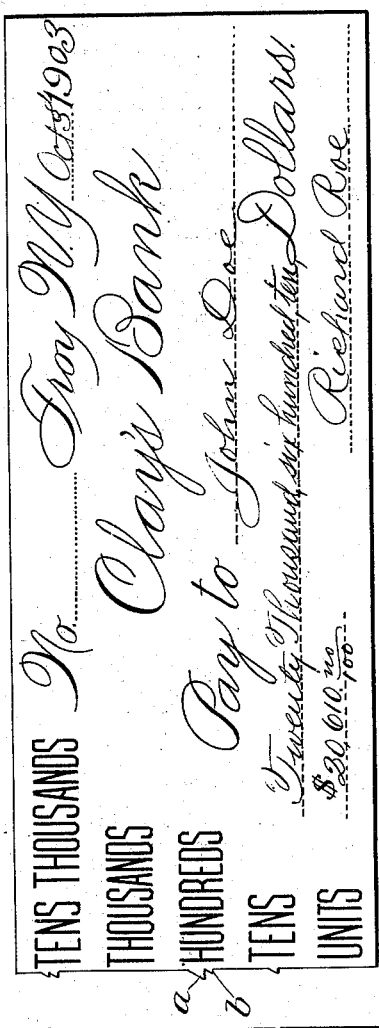
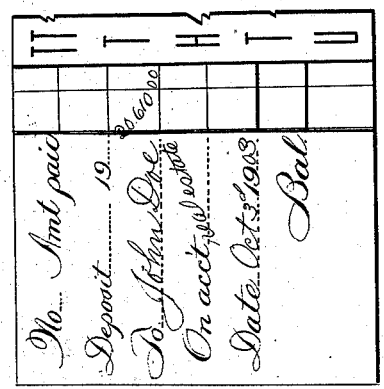
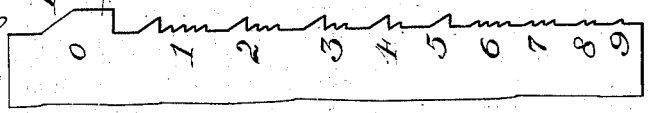
Witnesses
Inventor:

No. 741,901. Patented October 20, 1903.

UNITED STATES PATENT OFFICE.

STANLEY W. FINCH, OF WASHINGTON, DISTRICT OF COLUMBIA.

SEVERING-RULE FOR CHECKS, &c.

SPECIFICATION forming part of Letters Patent No. 741,901, dated October 20, 1903.

Application filed January 3, 1903. Serial No. 137,716. (No model.)

*To all whom it may concern:*

Be it known that I, STANLEY W. FINCH, a citizen of the United States, residing at Washington, in the District of Columbia, have invented certain new and useful Improvements in Severing-Rules for Checks and the Like, of which the following is a specification.

My present invention pertains to improvements in severing-rules and the like, and is designed more particularly for use in protecting checks and other evidences of value.

The invention is best understood upon reference to the accompanying drawings, in which—

Figure 1 is a face view of the preferred form of the severing device; Fig. 2, a transverse sectional view on the line 1 1 of Fig. 1; Fig. 3, a sectional view on the line 2 2 of Fig. 1; Fig. 4, a face view of a modified form; Fig. 5, a transverse section thereof on the line 3 3 of Fig. 4; Fig. 6, a face view of the actuating keys or fingers; Fig. 7, a top plan view of a further modification; Fig. 8, a similar view; Fig. 9, a like view in which the rule is formed of a series of members pivotally connected together; Fig. 10, a plan view showing the device illustrated in Fig. 9 as closed; Fig. 11, a plan view showing a still further modification; Fig. 12, a face view of a still further modification; Fig. 13, a transverse sectional view on the line 4 4 of Fig. 12; Figs. 14 and 15, plan views of still further modified forms; Fig. 16, a sectional view showing one of the locking-keys employed in conjunction with the forms shown in Figs. 14 and 15; Fig. 17, a still further modification of my invention; Fig. 18, an illustration showing a check and the stub from which it has been severed, said check having formed thereon a series of projections made by a rule constructed in accordance with my invention; and Fig. 19, a face view of a rule, showing another embodiment of my invention.

The object of my invention is, as above indicated, to provide a severing rule or device, by the use of which a character or series of characters of special form and relation may be produced upon a check to indicate the value for which it was drawn and protect it against being raised.

The check and its stub are made the subject-matter of my application, filed on or about the 13th day of September, 1902, Serial No. 123,348, and are not herein claimed.

Referring to Figs. 1 to 3, inclusive, A denotes the base or body of the severing-rule, along one edge of which is formed a series of notches or depressions, there being in the form illustrated five groups of said notches or depressions, corresponding to units, tens, hundreds, thousands, and tens of thousands.

As will be seen upon reference to Fig. 1, the first notch of each group is somewhat larger and deeper than the others and is designed to form a projection, such as $a$, Fig. 18, and to indicate a value of five. The four remaining notches of each group are somewhat smaller and indicate one, two, three, and four when one, two, three, or four of them are present. When the small notches are used in conjunction with the large one, they denote according to their position with relation to the large notch, six, seven, eight, and nine, respectively. Thus, as will be seen opposite the hundreds notation appearing on the check shown in Fig. 18, a large projection $a$ and a small one $b$ are formed, which indicate six hundred. Opposite the tens of thousands two small projections are made, and these indicate two or twice ten thousand, or twenty thousand. A single small projection is formed opposite the ten, which indicates ten dollars. The edge of the check opposite the words "thousands" and "units" is left smooth or straight, which indicates that no denomination of these particular values appears upon the face of the check.

Normally all of the notches are covered by a series of slides, there being one for each notch, and these slides are preferably of the form illustrated in the drawings. As will be seen, the forward or outer end of each slide is beveled off upon its upper face, and the body thereof extends beneath cross-bars B, C, and D, the rear end of each slide E being formed with a notch or recess, into which the cross-bar D projects when the slides are moved outwardly or into a position to cover the notches. Normally the slides are held up into engagement with bar D by springs F, a spring being preferably provided for each slide.

Each slide has secured to it a spring, such as G, the opposite end of said spring being secured to a fixed portion of the device—as, for instance, to a pin H, secured to cross-bar C. These springs tend normally to draw the slides back and away from the severing edge of the rule, and thus to uncover the notch or recess formed in the severing edge.

Any arrangement of the springs which will retract the slides so as to uncover the notches is of course within the scope of my invention.

To properly protect the springs, a cover-plate I is secured thereover, said plate likewise affording space for the placing thereon of suitable designations—such as units, tens, hundreds, thousands, and tens of thousands—opposite each particular group of notches formed along the edge of the rule.

In order to depress any one or more of the slides, and thus to relieve it or them from engagement with the cross-bar D, and thereby to permit the springs G to withdraw the slide or slides, I provide a series of keys, as best shown in Fig. 3. Each key comprises a spring finger or arm J, which is connected to one of the spacing members or bars K, extending transversely across the rule above the upper series of slides and intermediate each of the other series of slides, there being a series of keys for each of the groups of notches. The spring fingers or arms J, which lie above the slides and beneath the top plate L, are each provided with finger-pieces M, which occupy a position above plate L. The under face of each spring finger or arm J is notched, so as to act upon one or more of the series of slides in the particular group with which it works in conjunction. The key (illustrated in Fig. 3) is designed to act upon four of the slides, depressing the same and permitting the springs to retract them, and thus to expose four of the small notches, leaving the large notch covered. If the rule were then used upon a check, a series of four small projections would be formed, indicating a total value of four.

As will be readily understood, by properly notching each bar of the series the desired slides will be actuated to uncover the notches, which will produce projections of a form and value equal to the particular key depressed.

In practice the severing-rule is placed upon the line of severance of the combined check and stub and the keys depressed to expose the notches which are to form the projections indicative of a value equal to the face value of the check. After the slides have been properly retracted it is necessary only to tear the check from its stub, drawing the check against the severing edge of the rule. After the check has been severed the slides may be returned to their outermost position to properly cover the notches by the actuation of pivoted plate or bar N, which is positioned to act upon the rear ends of slides E after said slides have been moved backwardly to uncover the notches. No matter how many slides have been retracted plate or bar N will act upon them simultaneously and by one movement will project them forwardly to cover the notches.

In Figs. 4 to 6, inclusive, a modified form of the device is shown. In said form the slides O, which cover the notches, are of the same general character as those shown in Fig. 1, but are moved manually to uncover the notches. Said slides pass beneath bars P and Q and are normally held in their closed position by reason of bar Q passing down into a notch or recess formed in the upper rear end of each slide. As will be seen upon reference to Fig. 5, these slides are cut away throughout the major portion of their length, thus forming, in effect, a spring extension at the rear of the slides, which causes them to move up into engagement with bar Q, as shown in the figure just alluded to, when they are so positioned that the notch or recess comes into line with said bar Q. In the act of retracting a slide it is first depressed to release it from contact with bar Q, after which it may be moved rearwardly to expose the severing-notch at the outer edge of the rule which it previously covered. To limit its rearward movement, the slide is provided with a shoulder Q', which abuts against bar Q when the slide is retracted.

To move the slides rearwardly to uncover the notches, I provide a series of fingers or arms R, one for each slide. By preference these fingers or arms will be formed as shown in Figs. 4 and 6, the arm upon the outermost slide at one side of the particular group being lower than the others and the height of said fingers or arms increasing as they progress toward the opposite side or outer member. The outermost arms will likewise be formed with a lateral projection S to facilitate the movement of the slides. These arms or fingers may be provided upon their faces with a series of numerals or characters to indicate the value of the notch which they cover, as shown in Fig. 6.

A pivoted return bar or member T, similar to that employed in connection with the construction above described, will be employed in this form of device to return the slides outwardly to again cover the notches after the rule has been used to protect a check. A spring T' is employed to normally hold the return-bar T in the position shown in Fig. 5.

Referring to Fig. 7, the rule therein shown comprises a base-plate U, formed with an elongated opening V, which extends outwardly to the edge thereof. Pivoted upon said base-plate U is a plate W, provided with a series of arms X, extending radially therefrom and adapted to be brought one at a time into line with opening V as plate W is rotated. Each one of the arms X is provided with a notch or series of notches, as the case may be, at its end, said notches being indicative of certain numerical values, as from one to nine. Each arm X is also preferably provided with a knob Y, which facilitates the turning of plate W and the stopping of the particular arm desired in line with the opening V in plate U. As one of the arms X comes into line with the opening V it is depressed, so that its outer edge lies upon the check in line with plate U and forms, in effect, a continuation of the severing edge of the body. With this construction the projection or projections opposite any particular decimal or like notation upon the body of the check have to be formed separately— that is to say, each projection or series of projections opposite a particular decimal notation upon the end of the check has to be formed independently of those opposite the other decimal notations if such others are to be formed.

In Fig. 8 the rule shown is a single metal plate having formed along one edge notches designed to indicate the numerical values from one to nine and adapted to form upon the end of a check corresponding projections. It will be understood that this rule is to be moved along upon the check to bring the particular notches to be used opposite the decimal notation adjacent to which the projections are to be formed.

In Fig. 9 a series of separate rules each having a notch or a series of notches formed along one edge are shown. The rules are pivotally connected together at one end and are shown as closed in Fig. 10.

In Fig. 11 a single plate is shown having a series of integrally-formed fingers Z. These fingers are produced by cutting or slitting the plate, as indicated, and lie close to one another. The lower end of the outermost finger stands in a plane somewhat higher than the next adjacent finger, and this is true of the entire series of fingers. The lower end of each finger is preferably rounded, as at A', to facilitate the entrance of the check between the two adjacent fingers. Each finger contains a notch or a series of notches designed to form projections indicative of a different monetary value.

In Figs. 12 and 13 a still further modified form is shown, wherein a single plate B' is provided with a series of notches designed to form projections upon a check, said projections being indicative of different numerical or monetary values from one to nine. Plate B' carries a series of slides C', one for each notch or series of notches, as the case may be. These slides are held in place by a cross-plate D', secured to plate B' and to spacing-blocks E', placed intermediate each of the slides. As will be seen upon reference to Fig. 13, these slides are each preferably provided with an integrally-formed inverted-V-shaped projection or arm F', the lower outer end of which bears against a bar or plate G', secured to the base-plate B'. Arm F' is formed of spring metal, so that normally the slides will be projected into line with the edge of the base-plate, and thus cover the notches along the edge of said base-plate, forming a straight cutting or severing edge.

In Fig. 14 a base-plate H' is shown having a series of notches formed along its edge capable of producing upon a check and the like a series of projections indicative of a monetary value of from one to nine. Mounted upon the base-plate H' is a sliding plate I', which carries a series of keys J', the stems of which are surrounded by a spring K', interposed between the under face of the keys and the upper face of plate I', as best illustrated in Fig. 16. Base-plate H' is also provided with a series of openings L', nine in number, and one for each of the nine keys carried by plate I'. These openings are so arranged with relation to the notches that plate I', which carries the keys and is provided with an opening at its edge, must be moved to a position to bring one or the other of the keys into juxtaposition with its corresponding opening before it can be depressed to lock plate I' to base-plate H'. When a particular key is depressed and passed into its corresponding opening in the base-plate, plate I' is positioned so that the opening formed therein is opposite the notch or notches capable of forming projections indicative of a value equal to that of the key depressed. The "6" key is supposed to have been depressed in Fig. 14, and it will be seen that the opening in plate I' is opposite those notches which form projections indicative of six. The rear edge of plate I' will preferably pass under an upstanding and overhanging edge formed upon the base-plate. A pin carried by plate I' works in a groove or way N', formed in base-plate H'.

In Fig. 15 a further modification of the invention illustrated in Fig. 14 is shown. Instead of employing a series of notches along one edge, as in Fig. 14, but one group of notches is employed, and that is designed to form a large projection indicative of five and four small projections indicative of four ones or four. A plate O' is mounted to slide upon a base-plate P' in a manner similar to that shown in Fig. 14, except that in the present instance the pin Q' is carried by the base and the slot is formed in the slide. The opening in plate O', adjacent to the severing edge of base-plate P', is provided with an inclined edge R', which stands at the same angle to the cutting edge as does the inclined faces or edges S' of the various notches. The edge T' of the slide stands at right angles to the edge of the slide and the base-plate or parallel to the corresponding edges U' of the notches. A series of keys similar to those shown in Fig. 16 is carried by plate O', and five openings are arranged across said plate in line with the central portion of the space occupied by the notches. The keys are arranged in such manner that one or the other of two of them may be placed in the openings common to said pair, while the fifth opening is designed to work in conjunction with the key indicative of nine, which will so position the plate that all of the notches will be exposed, as shown in the drawings. By moving said plate up or down away from the position shown and depressing one or the other of the keys it will be seen that the various projections indicative of a numerical value of from one to eight may be formed, the remainder of the notches not in use being covered by the slide, the edges R' and T' coinciding with the edges S' and U', as the case may be.

In Fig. 17 I have shown a still further modification of my invention. In said figure, W' indicates a base-plate having a series of notches formed along one edge thereof, said notches being designed to produce a series of projections upon the edge of a check indicative of a value of from one to nine. A slide X' is pivotally connected to said base-plate W' at the upper right-hand corner thereof, said slide X' being formed with a closed slot at its lower end, into which extends a pin Z', projecting from base-plate W'. A spring Z², attached to said base-plate and to the slide, tends to move the latter outwardly and to cover the various notches, the outward movement of the slide being limited by the pin coming into contact with the slide at the end of the slot. In practice this severing device is laid upon the check, with the slide withdrawn from the edge in the manner shown in the drawings. The check is then drawn against the edge of the rule to form the particular notch or notches desired, after which the slide is released, so that it may come flush with the edge of the base-plate. The check may then be completely severed from its stub along the continuous edge of the slide, which, as just stated, stands in line with the edge of the base-plate, completely covering the notches.

In Fig. 19 there is shown a rule designed to produce upon the edge of a check a series of recesses or notches which will protect the check in a manner just the reverse of that shown in Fig. 18. It is to be noted, however, that with this construction where no valuation is indicated under any particular decimal or like notation a recess or notch must be formed in the edge of the check to denote the fact and that said recess or notch must be of such extent as to cover or practically cover the entire space opposite the decimal notation on the body of the check. A projection, such as A², for producing such a notch or recess in the edge of the check is formed at the upper end of the rule. The remaining projections on the rule are, however, quite similar in shape to the notches formed in the rule above described; but it will be noted that the large projection with the four small ones indicates one, thus forming in the check when it is desired to indicate "1" a large notch and a series of four small ones immediately adjacent thereto. In other words, this method of protecting a check is simply a reversal of that above described. The value of two is indicated by the large projection and three small ones, the value of three by the large projection and two small ones, the value of four by the large projection and one small one, and so on throughout the series, as shown in Fig. 19.

The notches or characters to be formed upon the check may be of any desired contour so long as they are not subject to alteration to raise the value of the check, those shown being merely illustrative.

It is manifest that the constructions herein described may be modified without departing from the spirit of my invention, and it is likewise manifest that various other forms of the device will suggest themselves. The claims therefore are to be given a broad interpretation, except as to those which are specifically limited to the constructions herein shown and described.

Having thus described my invention, what I claim is—

1. A severing rule or device for protecting checks and the like, having a character or series of characters formed along its edge, said character or series of characters being of special form indicative of a particular monetary value and adapted to form on a check and the like as it is severed from its stub, a character or series of characters of a form complemental to those on the severing device.

2. A severing rule or device for protecting checks and the like, having a character or series of characters formed therein along its edge, said character or series of characters being of special and varying form and occupying a definite position with relation one to the other, whereby a character or a series of characters may be formed with said rule along the edge of checks and the like indicative of a predetermined value.

3. A severing rule or device for protecting checks and the like, comprising a body portion having a series of characters along its edge, said characters being of special and varying form and occupying a definite position with relation one to the other; and means for exposing one or more of said characters at the cutting edge of the body portion.

4. A severing rule or device for protecting checks and the like, comprising a body portion having a series of characters formed therein along its edge, said characters being of special form indicative of a fixed monetary value; and means carried by the body portion and movable thereon for exposing one or more of said characters.

5. A severing rule or device for checks and the like, comprising a body portion having a severing edge provided with a series of notches of special form; and means for covering one or more of said notches and thereby restoring in part the continuity of the edge, substantially as described.

6. A severing rule or device for checks and the like, comprising a body portion having a severing edge provided with a series of notches of special form; and means mounted upon and movable over the body portion to cover one or more of said notches, substantially as described.

7. A severing device for checks and the like, comprising a body portion having a severing edge provided with a series of notches of special form; and a series of slides mounted upon said body portion adapted and arranged to be moved back and forth over the notches, substantially as described.

8. A severing rule or device for checks and the like, comprising a body portion having a severing edge provided with a series of notches of special form; a series of slides mounted upon said body portion and adapted to cover the notches; means for withdrawing the slides from over the notches; and means for returning the slides to cover the notches.

9. A severing rule or device for checks and the like, comprising a body portion having a severing edge provided with a series of notches of special form; a series of slides mounted upon said body portion and adapted and arranged to cover the notches; means for releasing one or more of the slides and automatically moving them away from the notches; and means for automatically returning all of said slides at one movement to cover the notches from which they have been withdrawn.

10. A severing rule or device for checks and the like, comprising a body portion having a severing edge provided with a series of notches of special form; a series of slides normally covering said notches; a device for holding the slides in said position; means for releasing any one or more of said slides from said retaining device; means for automatically withdrawing the slide or slides so released; and means for returning the slides to their normal position over the notches.

11. In a severing rule or device for checks and the like, the combination of a body portion having a severing edge provided with a series of notches of special form; a series of slides mounted upon said body portion and covering the notches, substantially as described; a bar carried by the body portion; means for elevating the slides and for causing them to engage the bar and thus normally to hold the slides over the notches; means for depressing one or more of said slides; springs for moving said slides away from the notches; and a bar pivotally mounted upon the frame and acting upon the rear ends of the slides to return them outwardly to cover the notches, substantially as described.

12. In a severing rule or device for checks and the like, the combination of a body portion having a severing edge provided with a series of notches of special form; a series of slides mounted upon said body portion and normally covering the notches; a series of keys mounted above said slides; means carried by the keys for releasing one or more of said slides according to the denomination of the key actuated; and means for retracting the slides thus released.

In testimony whereof I have signed my name to this specification in the presence of two subscribing witnesses.

STANLEY W. FINCH.

Witnesses:
   HORACE A. DODGE,
   C. C. BENDINE.